Figure 3:
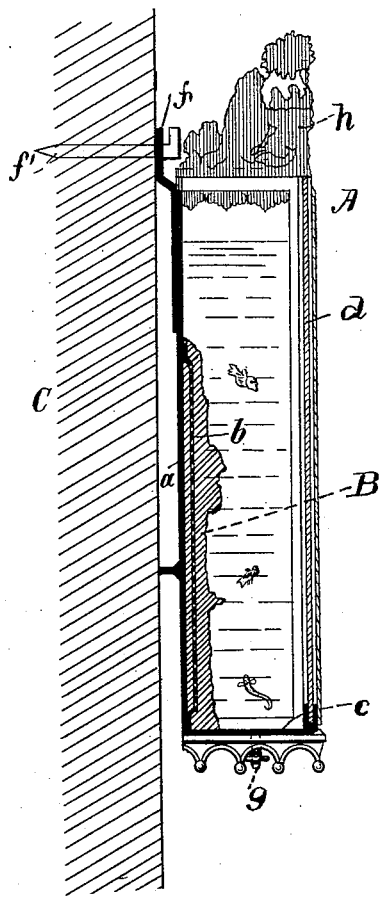

(No Model.)
E. G. LOCHMANN.
PICTURE AQUARIUM.
No. 475,404.
2 Sheets—Sheet 1.
Patented May 24, 1892.
*Fig.1.*
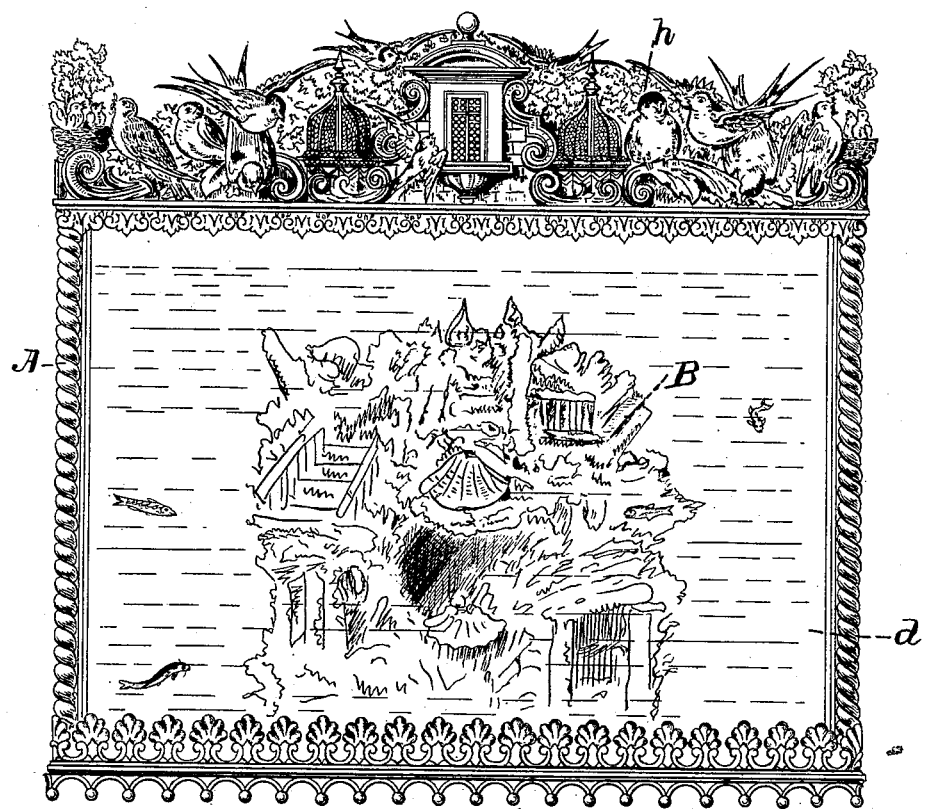
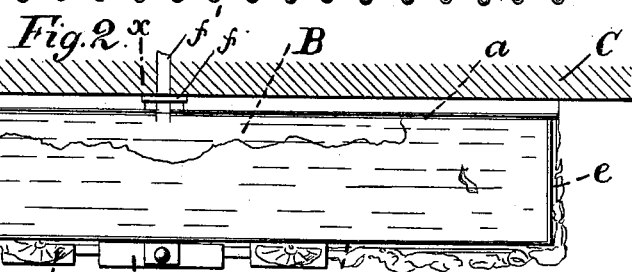
Witnesses:
A. Faber du Faur
F. Fohr.
Inventor:
Ernst Georg Lochmann,
by A. Faber du Faur Jr.
Attorney.
THE NORRIS PETERS CO., PHOTO-LITHO., WASHINGTON, D. C.

(No Model.) 2 Sheets—Sheet 2.

E. G. LOCHMANN.
PICTURE AQUARIUM.

No. 475,404. Patented May 24, 1892.

Witnesses:
A. Faber du Faur
T. Fohr.

Inventor:
Ernst Georg Lochmann,
by A. Faber du Faur,
Attorney.

THE NORRIS PETERS CO., PHOTO-LITHO., WASHINGTON, D. C.

UNITED STATES PATENT OFFICE.

ERNST GEORG LOCHMANN, OF GOHLIS-LEIPSIC, GERMANY.

PICTURE-AQUARIUM.

SPECIFICATION forming part of Letters Patent No. 475,404, dated May 24, 1892.

Application filed August 13, 1891. Serial No. 402,557. (No model.)

*To all whom it may concern:*

Be it known that I, ERNST GEORG LOCHMANN, a subject of the King of Prussia, residing at Gohlis-Leipsic, in the Kingdom of Saxony, German Empire, have invented new and useful Improvements in Picture-Aquariums, of which the following is a specification.

My invention has reference to an aquarium of special construction which is adapted to be secured to the wall of a room in the manner of a picture to serve as a wall decoration.

It consists, essentially, in a water-tight tank having its width comparatively small with respect to its height and length and having its front and sides closed by a transparent material, said tank containing a grotto or other representation formed of an aggregation of pebbles, shells, or the like secured to the back thereof, and means for securing the aquarium to a wall, all of which is more fully pointed out in the following specification and claim, and illustrated in the accompanying drawings, in which—

Figure 1 represents a front view of a picture-aquarium constructed according to my invention. Fig. 2 is a plan view thereof showing the same attached to a wall. Fig. 3 is a vertical section in the plane $x\ x$, Fig. 2.

Similar letters indicate corresponding parts.

In the drawings, the letter A designates a tank open at the top and having its rear wall $a$ and bottom wall $c$ formed of sheet-iron, brass, or other similar material, while its front wall $d$ and side walls $e$ are closed water-tight by panes of glass or other transparent material; or, if desired, only the front wall may be made of transparent material. To the rear wall $a$ is affixed a grotto B, built up of pebbles, stones, shells, and the like, either natural or artificial, arranged to present an ornamental appearance. However, instead of the grotto any other representation in relief formed of any suitable material or composition of materials may be substituted. The grotto or other representation is placed at the back of the tank and secured, preferably, to the rear wall. As shown in Fig. 3 of the drawings, a perforated plate $b$, approximating the grotto in size, is soldered to the rear wall, to which plate the grotto is secured by a suitable cement, which passes through the perforations, whereby a firm adherence is attained.

In practice the width of the tank is made very small compared with the height and length thereof, whereby the fishes placed therein are compelled to swim with their sides toward the front and can always be seen in full from the front. The tank is secured to the wall C in any usual manner—for instance, by means of the eye $f$ on said tank and a nail or hook $f'$ driven into the wall, whereby the aquarium serves, also, as a wall-decoration. If desired, the top of the front and side walls can be supplied with a suitable ornamental cornice, as $h$, and a suitable outlet-pipe in the bottom, closed by a cock $g$, may be provided for drawing off the water without disturbing the tank.

What I claim as new, and desire to secure by Letters Patent, is—

An aquarium provided with means for securing the same to a wall in the manner of a picture and having a perforated plate arranged in front of and secured to the rear wall, and a pictorial representation built up of stones, shells, or other material cemented to said plate, substantially as described.

In testimony whereof I have signed my name to this specification in the presence of two subscribing witnesses.

ERNST GEORG LOCHMANN.

Witnesses:
 HUGO TELLER,
 CARL BORNGRAEBER.